June 12, 1923.
H. B. GARMAN
DRAG LINK
Filed Dec. 14, 1921
1,458,331
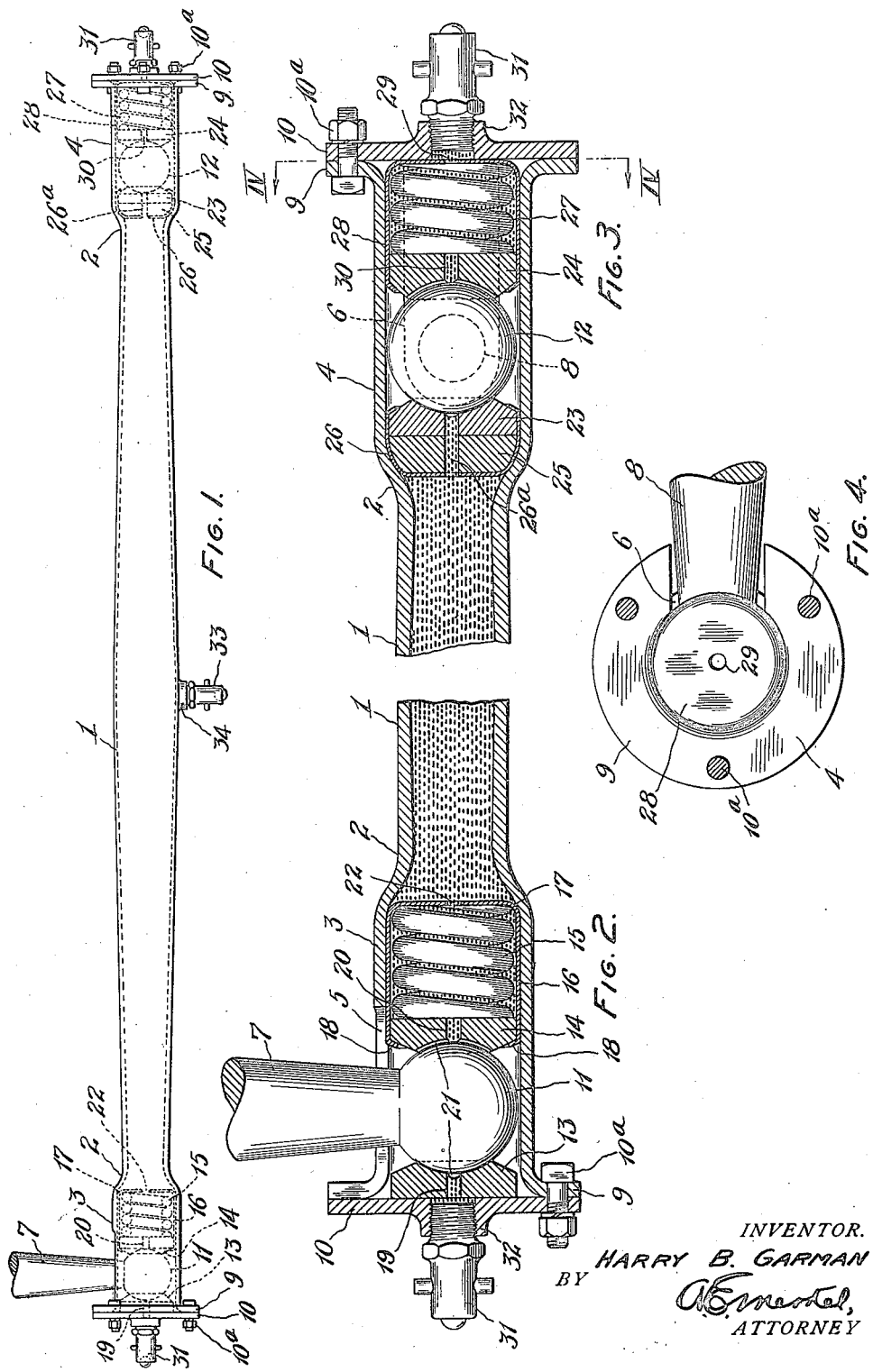
INVENTOR.
HARRY B. GARMAN
BY
ATTORNEY Patented June 12, 1923.

1,458,331

UNITED STATES PATENT OFFICE.

HARRY B. GARMAN, OF DETROIT, MICHIGAN, ASSIGNOR TO THE STEEL PRODUCTS COMPANY, OF CLEVELAND, OHIO, A CORPORATION OF OHIO.

DRAG LINK.

Application filed December 14, 1921. Serial No. 522,374.

*To all whom it may concern:*

Be it known that I, HARRY B. GARMAN, a citizen of the United States, resident of Detroit, county of Wayne, and State of Michigan, have invented new and useful Improvements in Drag Links, of which the following is a specification, the principle of the invention being herein explained and the best mode in which I have contemplated applying that principle, so as to distinguish it from other inventions.

This invention relates to drag links for use as a part of the steering mechanism of automobiles and has for an object to provide new and improved means for effectively lubricating the balls and bearings associated with the connecting arms. A further object is to effectively protect the bearings against the entrance of dust and dirt.

The present application is a division of my copending application, Serial No. 489,361, filed August 2, 1921.

The annexed drawings and following description, set forth in detail certain means embodying my invention, the disclosed means however, constituting but one of the various mechanical forms in which the principle of the invention may be employed.

In said annexed drawings:

Fig. 1 represents a side elevation of my improved drag link, including a suggestion of the usual connecting arms and associated elements.

Figs. 2 and 3 represent, respectively, upon an enlarged scale, central vertical sections of the axle arm end and the steering arm end of the drag link.

Fig. 4 represents a section taken on the plane indicated by the line IV—IV of Fig. 3.

Referring to the annexed drawing, in which the same parts are indicated by the same ordinals in the several views, a piece of steel tubing 1 is swage tapered toward both ends down to the neck portion 2 adjacent the ends of the link, the end portions of the tubing beyond the neck portions 2 forming end sockets 3 and 4 which are provided with slots 5 and 6 to receive the axle arm 7 and steering arm 8, respectively. The ends of the tubing are formed with outwardly directed flanges 9 to which end cover plates 10 are attached by means of bolts 10ª.

The axle arm 7 and steering arm 8 have ball ends 11 and 12 entered in the slots 5 and 6 and seated in the end sockets 3 and 4. The ball end 11 is engaged on the outside by a bearing block 13 resting against the inner face of the end plate 9 and on the inside by a similar bearing block 14. The bearing block 14 is yieldingly pressed against the ball 11 by a coil spring 15. The block 14 and the spring 15 are enclosed in a sheet metal grease retaining case 16 the rear end of which is seated against the shoulder 17 formed between the neck portion 2 and socket portion 3. The forward end of the case 16 has inturned flanges 18 extending over the outer edge of the block 14. This arrangement permits the block 14 to move inwardly in the case 16 against the pressure of the spring 15, so that a cushioned bearing is provided for the arm 11. The bearing blocks 13 and 14 are provided with central lubricant passages 19 and 20. The ball engaging faces of the bearing blocks 13 and 14 are concave to fit the spherical contour of the ball end 11 and are each provided with a groove 21 in their concave face to distribute the lubricant over the surface of the ball end. The case 16 has a central perforation 22 at its rear end to admit lubricant thereinto.

The ball end 12 of the steering arm 8 is engaged on the inner side thereof by a bearing block 23 and on its outer side by a bearing block 24. The blocks 23 and 24 are similar in all respects to the bearing blocks 13 and 14 above described. The rear face of the inner block 23 rests against a filler block 25 and the blocks 23 and 25 are enclosed in a sheet metal casing 26. An axial lubricant passage 26ª is provided through the blocks 23 and 25 and case 26 to permit passage of lubricant to the surface of the ball end 12. The block 24 is yieldingly pressed against the ball end 12 by means of a coil spring 27. The block 24 and spring 27 are enclosed in a grease retaining case 28 similar in all respects to the case 16 above described. The outer end of the case 28 is seated against the end plate 9 and is provided with a central aperture 29 to admit lubricant thereinto, and the block 24 has an axial passage 30 to carry lubricant to the ball end 12.

For supplying lubricant to the outer bearings the end plates 9 carry axially disposed grease cups 31 which are secured in central tapped bosses 32 on the end plates. For supplying lubricant to the inner bearings a grease cup 33 is secured in a tapped boss 34 welded to the center of the tubing 1. The lubricant passes from the grease cup 31 at the axle arm end of the link through the passage 19 to the ball end 11. At the steering arm end the lubricant passes through the aperture 29 into the retaining case 28 and through the axial passage 30 in the block 24 to the surface of the ball end 12. The central portion of the tube is adapted to be filled with lubricant from the grease cup 33. The lubricant from the central portion of the tubing 1 passes through the aperture 22 into the retaining case 16 and through the axial passage 20 in the block 14 to the surface of the ball end 11, and through the axial passage 26$^a$ through casing 26 and block 25 and 23 to the surface of the ball end 12.

What I claim is:

1. A drag link comprising a tubular member having a slotted end socket; an arm extending through the slot and having a ball end journaled in said socket; a bearing block in said socket engageable with said ball on one side thereof a spring for yieldingly pressing said bearing block into engagement with said ball and a grease retaining case enclosing said block and spring.

2. A drag link comprising a piece of tubing having a slotted end socket; an arm extending through the slot and having a ball end journaled in said socket; a bearing member engageable with the inner side of said ball, said member having a passage for lubricant therethrough; and a grease retaining case enclosing said bearing member.

3. A drag link comprising a tubular member having slotted end sockets; arms extending through the slots and having ball ends journaled in said sockets; bearing members engageable with opposite sides of said balls; means for supplying lubricant to said bearing members; and grease retaining cases enclosing said bearing members.

4. A drag link comprising a tubular member having a slotted end socket; an arm extending through the slot and having a ball end journaled in said socket; a bearing block engageable with one side of the ball, said block having a lubricant passage therethrough; a spring for yieldingly pressing said block against said ball; a grease retaining case enclosing said block and spring, said case having a lubricant entrance opening in the end opposite said block; and means for supplying lubricant to the tube at the rear of said case.

Signed by me this 9th day of November, 1921.

HARRY B. GARMAN.